United States Patent
Lee et al.

(10) Patent No.: US 9,614,196 B2
(45) Date of Patent: Apr. 4, 2017

(54) MIDDLE OR LARGE-SIZED BATTERY PACK ASSEMBLY

(71) Applicant: LG CHEM, LTD., Seoul (KR)

(72) Inventors: BumHyun Lee, Daejeon (KR); Yong Shik Shin, Daejeon (KR); Jin Kyu Lee, Daejeon (KR); DalMo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 301 days.

(21) Appl. No.: 14/259,825

(22) Filed: Apr. 23, 2014

(65) Prior Publication Data
US 2014/0234690 A1 Aug. 21, 2014

Related U.S. Application Data

(63) Continuation of application No. PCT/KR2012/011565, filed on Dec. 27, 2012.

(30) Foreign Application Priority Data

Jan. 2, 2012 (KR) ........................ 10-2012-0000101

(51) Int. Cl.
| | |
|---|---|
| H01M 2/02 | (2006.01) |
| H01M 10/00 | (2006.01) |
| H01M 2/10 | (2006.01) |
| H01M 10/04 | (2006.01) |
| H01M 10/42 | (2006.01) |
| H01M 10/6557 | (2014.01) |
| H01M 10/613 | (2014.01) |
| H01M 10/0525 | (2010.01) |

(52) U.S. Cl.
CPC ....... H01M 2/0247 (2013.01); H01M 2/1077 (2013.01); H01M 10/0481 (2013.01);
(Continued)

(58) Field of Classification Search
CPC ............. H01M 2/0247; H01M 2/1077; H01M 2/0275; H01M 2/1094; H01M 10/0481;
(Continued)

(56) References Cited

U.S. PATENT DOCUMENTS

2008/0157905 A1  7/2008  Parker et al.
2008/0292962 A1* 11/2008  Jung ................... H01M 2/0275
                                                              429/211
(Continued)

FOREIGN PATENT DOCUMENTS

JP    2005-50616 A    2/2005
JP    2009-529218 A   8/2009
(Continued)

OTHER PUBLICATIONS

Machine Translation: Yoon et al (KR 10-2008-0027504).*
International Search Report for PCT/KR2012/011565 mailed on Apr. 22, 2013.

*Primary Examiner* — Stephen Yanchuk
(74) *Attorney, Agent, or Firm* — Birch, Stewart, Kolasch & Birch, LLP

(57) ABSTRACT

Disclosed herein is a battery pack including (a) a module assembly including two or more battery modules, each of which includes a chargeable and dischargeable battery cell, the battery modules being stacked to have a two layer structure including an upper layer and a lower layer while being in contact with each other in a lateral direction, (b) a first upper layer connection member and a second upper layer connection member mounted at the upper layer module assembly, (c) a first lower layer connection member and a second lower layer connection member mounted at the lower layer module assembly, (d) a pair of side support members, (e) insulation members mounted at interfaces between the sides of the upper and lower layer module assemblies and the side support members, and (f) a first lower end support member and a second lower end support member.

26 Claims, 14 Drawing Sheets

(52) U.S. Cl.
CPC ..... *H01M 10/425* (2013.01); *H01M 10/6557* (2015.04); *H01M 2/0275* (2013.01); *H01M 2/1094* (2013.01); *H01M 10/0525* (2013.01); *H01M 10/613* (2015.04); *H01M 2220/10* (2013.01); *H01M 2220/20* (2013.01); *Y02E 60/122* (2013.01); *Y02T 10/7011* (2013.01)

(58) Field of Classification Search
CPC ........... H01M 10/425; H01M 10/6557; H01M 10/7011; H01M 10/613; H01M 10/0525; H01M 2220/10; H01M 2220/20
See application file for complete search history.

(56) References Cited

U.S. PATENT DOCUMENTS

| | | | |
|---|---|---|---|
| 2009/0220853 A1* | 9/2009 | Yang | ................... H01M 2/0277 429/159 |
| 2009/0246606 A1 | 10/2009 | Shimizu | |
| 2010/0141214 A1 | 6/2010 | Yoon et al. | |
| 2010/0231164 A1 | 9/2010 | Yang | |
| 2010/0297482 A1 | 11/2010 | Yoon et al. | |
| 2011/0070474 A1 | 3/2011 | Lee et al. | |
| 2011/0206948 A1 | 8/2011 | Asai et al. | |
| 2013/0319777 A1 | 12/2013 | Choo et al. | |

FOREIGN PATENT DOCUMENTS

| | | |
|---|---|---|
| JP | 2010-213560 A | 9/2010 |
| JP | 2011-23302 A | 2/2011 |
| JP | 2011-504285 A | 2/2011 |
| JP | 2011-175743 A | 9/2011 |
| JP | 5231442 B2 | 7/2013 |
| JP | 5448116 B2 | 3/2014 |
| KR | 10-2008-0027504 A | 3/2008 |
| KR | 10-2009-0002428 A | 1/2009 |
| KR | 10-2009-0010393 A | 1/2009 |
| KR | 10-2011-0087938 A | 9/2011 |
| WO | WO 2009/066880 A2 | 5/2009 |

* cited by examiner

MIDDLE OR LARGE-SIZED BATTERY PACK ASSEMBLY

CROSS REFERENCE TO RELATED APPLICATIONS

This non-provisional application is a Continuation of International Application No. PCT/KR2012/011565 filed on Dec. 27, 2012, which claims priority to Korean Patent Application No. 10-2012-0000101 filed in Korea on Jan. 2, 2012. The entire contents of all of the above applications are hereby incorporated by reference.

TECHNICAL FIELD

The present invention relates to a battery pack and, more particularly, to a battery pack including (a) a module assembly including two or more battery modules, each of which includes a chargeable and dischargeable battery cell, the battery modules being stacked to have a two layer structure including an upper layer and a lower layer while being in contact with each other in a lateral direction, (b) a first upper layer connection member mounted at the upper layer module assembly to surround a portion of opposite sides and a front upper end of outermost battery modules of the upper layer module assembly and a second upper layer connection member mounted at the upper layer module assembly to surround a portion of the opposite sides and a rear upper end of the outermost battery modules of the upper layer module assembly, (c) a first lower layer connection member mounted at the lower layer module assembly to surround a portion of opposite sides and a front lower end of outermost battery modules of the lower layer module assembly and a second lower layer connection member mounted at the lower layer module assembly to surround a portion of the opposite sides and a rear lower end of the outermost battery modules of the lower layer module assembly, (d) a pair of side support members coupled to the upper layer connection members and the lower layer connection members to simultaneously surround sides of the upper and lower layer module assemblies, (e) insulation members mounted at interfaces between the sides of the upper and lower layer module assemblies and the side support members, and (f) a first lower end support member coupled to the side support members to support the front lower end of the lower layer module assembly and a second lower end support member coupled to the side support members to support the rear lower end of the lower layer module assembly.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery pack having a plurality of battery cells electrically connected to each other because high output and large capacity are necessary for the middle or large-sized devices.

Preferably, the middle or large-sized battery pack is manufactured so as to have as small a size and weight as possible. For this reason, a prismatic battery or a pouch-shaped battery, which can be stacked with high integration and has a small weight to capacity ratio, is usually used as a battery cell of the middle or large-sized battery pack. In particular, much interest is currently focused on such a pouch-shaped battery, which uses an aluminum laminate sheet as a sheathing member, because the pouch-shaped battery is lightweight and the manufacturing cost of the pouch-shaped battery is low.

FIG. 1 is a perspective view typically showing a conventional representative pouch-shaped battery. Referring to FIG. 1, the pouch-shaped battery 100 is configured to have a structure in which two electrode leads 110 and 120 protrude from the upper end and the lower end of a battery body 130, respectively, such that the electrode leads 110 and 120 are opposite to each other. A sheathing member 140 includes upper and lower sheathing parts. That is, the sheathing member 140 is a two-unit member. In a state in which an electrode assembly (not shown) is mounted in a receiving part which is defined between the upper and lower sheathing parts of the sheathing member 140, opposite sides 142 and upper and lower ends 141 and 143, which are contact regions of the upper and lower sheathing parts of the sheathing member 140, are bonded to each other, whereby the pouch-shaped battery 100 is manufactured.

The sheathing member 140 is configured to have a laminate structure of a resin layer/a metal film layer/a resin layer. Consequently, it is possible to bond the opposite sides 142 and the upper and lower ends 141 and 143 of the upper and lower sheathing parts of the sheathing member 140, which are in contact with each other, to each other by applying heat and pressure to the opposite sides 142 and the upper and lower ends 141 and 143 of the upper and lower sheathing parts of the sheathing member 140 so as to weld the resin layers thereof to each other. According to circumstances, the opposite sides 142 and the upper and lower ends 141 and 143 of the upper and lower sheathing parts of the sheathing member 140 may be bonded to each other using a bonding agent. For the opposite sides 142 of the sheathing member 140, the same resin layers of the upper and lower sheathing parts of the sheathing member 140 are in direct contact with each other, whereby uniform sealing at the opposite sides 142 of the sheathing member 140 is achieved by welding. For the upper and lower ends 141 and 143 of the sheathing member 140, on the other hand, the electrode leads 110 and 120 protrude from the upper and lower ends 141 and 143 of the sheathing member 140, respectively. For this reason, the upper and lower ends 141 and 143 of the upper and lower sheathing parts of the sheathing member 140 are thermally welded to each other, in a state in which a film type sealing member 160 is interposed between the electrode leads 110 and 120 and the sheathing member 140, in consideration of the thickness of the electrode leads 110 and 120 and the difference in material between the electrode leads 110 and 120 and the sheathing member 140, so as to improve sealability of the sheathing member 140.

However, the mechanical strength of the sheathing member 140 is low. For this reason, battery cells (unit cells) are mounted in a pack case, such as a cartridge, to manufacture a battery module having a stable structure. However, a device or a vehicle, in which a middle or large-sized battery module is installed, has a limited installation space. Consequently, in a case in which the size of the battery module is increased due to the use of the pack case, such as the cartridge, the spatial utilization is lowered. In addition, the battery cells repeatedly expand and contract during charge and discharge of the battery cells due to the low mechanical strength of the battery cells. As a result, the thermally welded regions of the sheathing member may be easily separated from each other.

In addition, a battery pack is a structural body constituted by combining a plurality of battery cells and, therefore, safety and operational efficiency of the battery pack are greatly lowered when some of the battery cells suffer from overvoltage, overcurrent, or overheating. For this reason, means to sense such overvoltage, overcurrent, or overheating are needed. Consequently, voltage sensors, temperature sensors, etc. are connected to the respective battery cells to check and control operational states of the battery cells in real time or at predetermined intervals. Installation or connection of such sensing means very complicates a process of assembling the battery pack. Furthermore, a plurality of wires is needed to install or connect the sensing means with the result that a short circuit may occur in the battery pack.

In addition, in a case in which a middle or large-sized battery module is configured using a plurality of battery cells or a middle or large-sized battery pack is configured using a plurality of unit modules each including a predetermined number of battery cells, a plurality of members for mechanical fastening and electrical connection between the battery cells or the unit modules is generally needed and, as a result, a process for assembling the mechanical fastening and electrical connection members is very complicated. Furthermore, there is needed a space for coupling, welding, or soldering the mechanical fastening and electrical connection members with the result that the total size of the system is increased. The increase in size of the system is not preferable in the aspect of the spatial limit of an apparatus or device in which the middle or large-sized battery module is installed. Moreover, the middle or large-sized battery module must be configured to have a more compact structure such that the middle or large-sized battery module can be effectively installed in a limited inner space, such as a vehicle.

In connection with this respect, Japanese Patent Application Publication No. 2005-050616 discloses a middle or large-sized battery module installed in a large-sized vehicle, such as a bus, configured to have a structure in which the battery module includes a lower rack in which two battery packs are disposed and an upper rack in which two battery packs are disposed, a stand member of the lower rack and a stand member of the upper rack are suspended from a body of the vehicle via a suspension member of the lower rack and a suspension member of the upper rack, the stand members exhibit high strength, and the suspension members exhibit low strength, thereby improving safety of the battery module against external force applied to the battery module due to a vehicle crash.

In the above-described middle or large-sized battery module, a plurality of racks is used to improve safety of the vehicle when a vehicle crash occurs. However, two complicated racks are provided to install a total of four battery packs with the result that volume and weight of the battery module are increased. Consequently, it is technically difficult to configure the battery module such that the battery module has a compact structure. That is, the above technology has problems in that the external form of the battery module must be greatly increased to provide high mechanical strength, whereby the volume and weight of the battery module are greatly increased.

Meanwhile, a battery module assembly is a structural body constituted by combining a plurality of battery cells and, therefore, safety and operational efficiency of the battery module assembly are greatly lowered when some of the battery cells suffer from overvoltage, overcurrent, or overheating. For this reason, means to sense and control such overvoltage, overcurrent, or overheating are needed. Consequently, voltage sensors, temperature sensors, etc. are connected to the respective battery cells to check and control operational states of the battery cells in real time or at predetermined intervals. Installation or connection of such sensing means and control means very complicates a process of assembling the battery module. Furthermore, a plurality of wires is needed to install or connect the sensing means and the control means with the result that a short circuit may occur in the battery module.

Therefore, there is a high necessity for a battery module assembly, the structure of which is more compact, structural stability of which is high, and to which sensing means can be mounted through a simple structure as described above.

DISCLOSURE

Technical Problem

Therefore, the present invention has been made to solve the above problems and other technical problems that have yet to be resolved.

Specifically, it is an object of the present invention to provide a battery pack having a compact and optimum disposition structure, by which the battery pack can be stably installed in a limited space, such as a vehicle, while minimally occupying the space using a small number of members, wherein the battery pack can be easily assembled and structural stability of the battery pack against external impact is excellent.

It is another object of the present invention to provide a middle or large-sized battery pack that can be manufactured using a simple assembling method without using a plurality of members for mechanical fastening and electrical connection, whereby general manufacturing costs of the battery pack is lowered.

Technical Solution

In accordance with one aspect of the present invention, the above and other objects can be accomplished by the provision of a middle or large-sized battery pack including (a) a module assembly including two or more battery modules, each of which includes a chargeable and dischargeable battery cell, the battery modules being stacked to have a two layer structure including an upper layer and a lower layer while being in contact with each other in a lateral direction, (b) a first upper layer connection member mounted at the upper layer module assembly to surround a portion of opposite sides and a front upper end of outermost battery modules of the upper layer module assembly and a second upper layer connection member mounted at the upper layer module assembly to surround a portion of the opposite sides and a rear upper end of the outermost battery modules of the upper layer module assembly, (c) a first lower layer connection member mounted at the lower layer module assembly to surround a portion of opposite sides and a front lower end of outermost battery modules of the lower layer module assembly and a second lower layer connection member mounted at the lower layer module assembly to surround a portion of the opposite sides and a rear lower end of the outermost battery modules of the lower layer module assembly, (d) a pair of side support members coupled to the upper layer connection members and the lower layer connection members to simultaneously surround sides of the upper and lower layer module assemblies, (e) insulation members mounted at interfaces between the sides of the upper and lower layer module assemblies and the side support members, and (f) a first lower end support member coupled to the side support members to support the front lower end of the lower layer module assembly and a second lower end support member coupled to the side support members to support the rear lower end of the lower layer module assembly.

In the middle or large-sized battery pack according to the present invention as described above, a plurality of rectangular battery modules is stacked in a vertical direction and in a horizontal direction to constitute a module assembly, which is fixed by specific members. Consequently, an assembly process of the middle or large-sized battery pack is simplified, the middle or large-sized battery pack has a compact and stable structure, and mechanical fastening and electrical connection of the middle or large-sized battery pack are achieved without using a large number of members.

In a preferred example, each of the battery modules may be configured to have a structure in which two or more battery cells or two or more unit modules each including a battery cell are mounted in a module case in a state in which the battery cells or the unit modules are electrically connected to each other.

Each of the unit modules may have various structures. A preferred example of the structure of each of the unit modules will hereinafter be described in detail.

Each of the unit modules may include two or more plate-shaped battery cells electrically connected to each other, each of the battery cells having electrode terminals formed at upper and lower ends thereof, respectively, the battery cells being electrically connected to each other in parallel or in series, electrode terminal connections of the battery cells being bent such that the battery cells are stacked, and cell covers coupled to each other to cover outsides of the battery cells excluding the electrode terminals.

Each of the plate-shaped battery cells is a secondary battery cell having a small thickness and a relatively large width and length so as to minimize the overall size of a battery module when the battery cells are stacked to constitute the battery module. In a preferred example, each of the battery cells may be a secondary battery cell configured to have a structure in which an electrode assembly is mounted in a battery case formed of a laminate sheet including a resin layer and a metal layer and electrode terminals protrude from the upper and lower ends of the battery case. Specifically, the electrode assembly may be mounted in a pouch-shaped case formed of an aluminum laminate sheet. The secondary battery cell with the above-described structure may also be referred to as a pouch-shaped battery cell.

Two or more of the battery cells may be covered by high-strength cell covers made of a synthetic resin or a metal material to constitute a unit module. The high-strength cell covers protect the battery cells exhibiting low mechanical strength and restrain the repetitive expansion and contraction fluctuation during the charge and discharge of the battery cells to prevent separation between sealed portions of the battery cells. Consequently, it is possible to manufacture a middle or large-sized battery module exhibiting higher safety In a preferred example, the first and second upper layer connection members may each include a frame body formed in a bracket shape in vertical section to simultaneously surround a portion of the opposite sides and the front upper end or the rear upper end of the module assembly and coupling parts extending from opposite sides of the frame body such that the coupling parts can be coupled to the side support members.

In addition, the first and second lower layer connection members may each include a frame body formed in a bracket shape in vertical section to simultaneously surround a portion of the opposite sides and the front lower end or the rear lower end of the module assembly and coupling parts extending from opposite sides of the frame body such that the coupling parts can be coupled to the side support members and the lower end support members.

The size of the coupling parts of the first and second upper layer connection member and the first and second lower layer connection member may be variously set based on coupling members coupled to the coupling parts. For example, the coupling parts of the first and second upper layer connection member and the first and second lower layer connection member may extend by a length equivalent to 20 to 80%, preferably 30 to 70%, the vertical length of each side of the module assembly.

According to circumstances, the frame body may be further provided at a region thereof contacting the module assembly with an elastic sealing member to prevent leakage of coolant.

The insulation members mounted at the interfaces between the sides of the upper and lower layer module assemblies and the side support members serve to guide coolant such that the coolant limitedly flows in a specific direction and, at the same time, reduce temperature deviation between the outside and inside module assemblies.

That is, the insulation members are mounted at opposite sides of the module assembly to close the opening of the module assembly such that coolant moves only through the module assembly stack. When the insulation members are not mounted, therefore, relatively rapid cooling of the outer battery modules exposed outward is prevented. Generally, rapid cooling of the battery modules is preferable. In the middle or large-sized battery system, however, a higher cooling rate of some battery modules causes unbalance between the battery modules and such unbalance between the battery modules accelerates degradation of the battery cells. Consequently, the insulation members serve to form a flow channel of coolant (air) and, at the same time, improve temperature uniformity between the unit battery modules.

The insulation members may be bent such that a coolant flow channel is formed at the inside of each of the insulation members facing the battery modules. In addition, the sealing member may be formed of a heat insulating material in order to further improve temperature uniformity between the battery modules as described above. In particular, the sealing member may be formed of resin foam in order to improve heat insulation while minimizing the total weight of the battery module assembly.

Meanwhile, each of the side support members may include a plate-shaped body disposed in tight contact with a corresponding side of the module assembly and a lower end frame bent so as to be coupled to the first or second lower end support member.

In addition, the lower end frame may be provided with through holes, through which fastening members are inserted to be coupled to the first or second lower end support member.

The lower end frame is fastened to the first and second lower end support members through the through holes to achieve doubling coupling. Consequently, the first and second lower end support members are securely coupled to the module assembly and, at the same time, durability of the module assembly is improved.

As previously described, each of the first and second lower end support members may include a lower fixing rib to support a bottom of the lower layer module assembly and coupling parts extending from opposite sides of the lower fixing rib so as to be coupled to the side support members.

In addition, one of the coupling parts may horizontally extend from the lower fixing rib and the other of coupling parts may extend from the lower fixing rib while being bent.

When the battery pack is installed in a device including the battery pack as a power source, the above structure may enable stable installation of the battery pack in a predetermined space of the device. For example, when the battery pack is installed in a space at the rear of a back seat of a vehicle, the above structure may enable easy installation of the battery pack in such an installation space.

Meanwhile, at least one of the side support members may include an opening, through which portions corresponding to electrode terminal connections of a corresponding one of the battery modules are exposed such that electrical connection portions of the battery module can be ruptured by expansion of the battery cell.

In this case, one of the insulation members may also include a 'ᴸ'-shaped or bracket-shaped cut-off part formed so as to correspond to electrode terminal connections of a corresponding one of the battery modules such that electrical connection portions of the battery module can be ruptured by expansion of the battery cell.

In a preferred example, at least one of the side support members may be further provided with a battery management system (BMS) to control operation of the battery pack.

Meanwhile, the module assembly may be configured to have a structure in which the upper layer battery modules are inversely stacked on the lower layer battery modules such that input and output terminals of the upper layer battery modules and input and output terminals of the lower layer battery modules are adjacent to each other.

In the above description, "inversely stacked structure" means that the same regions of two battery modules are arranged so as to face each other. For example, in a case in which each rectangular battery module is configured to have a structure in which input and output terminals are located at one side of each battery module, the rectangular battery modules may be arranged such that the input and output terminals of the respective battery modules are arranged to be directed toward a horizontal central axis of the battery module stack. This arrangement structure may further simplify construction for electrical connection.

In this battery module arrangement structure, a power relay assembly (PRA) for preventing overcurrent and overvoltage and lowering voltage during separation of the battery module assembly may be mounted at one side of the module assembly at which the input and output terminals of the battery modules are located.

In addition, fastening holes for mounting the PRA extending from at least one selected from a group consisting of the upper layer connection members, the lower layer connection members, the side support members, and the lower end support members may be formed at one side of the module assembly at which the PRA is mounted.

In a preferred example, the module assembly may further include an upper end connection member mounted along a top edge of the upper layer module assembly.

Specifically, the upper end connection member may be configured to have a quadrangular frame structure when viewed from top and may be coupled to the upper layer connection members and/or the side support members.

Meanwhile, each of the battery modules may be configured to have a structure in which one or more unit modules are sequentially stacked and mounted in a module case.

In addition, each of the battery modules may be configured to have a structure in which two or more unit modules are vertically stacked and through holes are formed at a top and a bottom of the module case such that a vertical coolant flow channel is defined from an upper part to a lower part of the battery module.

Fastening protrusions and fastening grooves for coupling between the upper layer battery modules and the lower layer battery modules may be provided at an interface between the upper layer battery modules and the lower layer battery modules.

In accordance with another aspect of the present invention, there is provided a device including the battery pack with the above-stated construction as a power source.

The battery pack according to the present invention may be manufactured by combining battery modules based on desired output and capacity. The battery pack may be used as a power source of an electric vehicle, a hybrid electric vehicle, an electric motorcycle, or an electric bicycle, which has a limited installation space and is exposed to frequent vibration and strong impact in consideration of installation efficiency and structural stability as described above; however, the present invention is not limited thereto.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
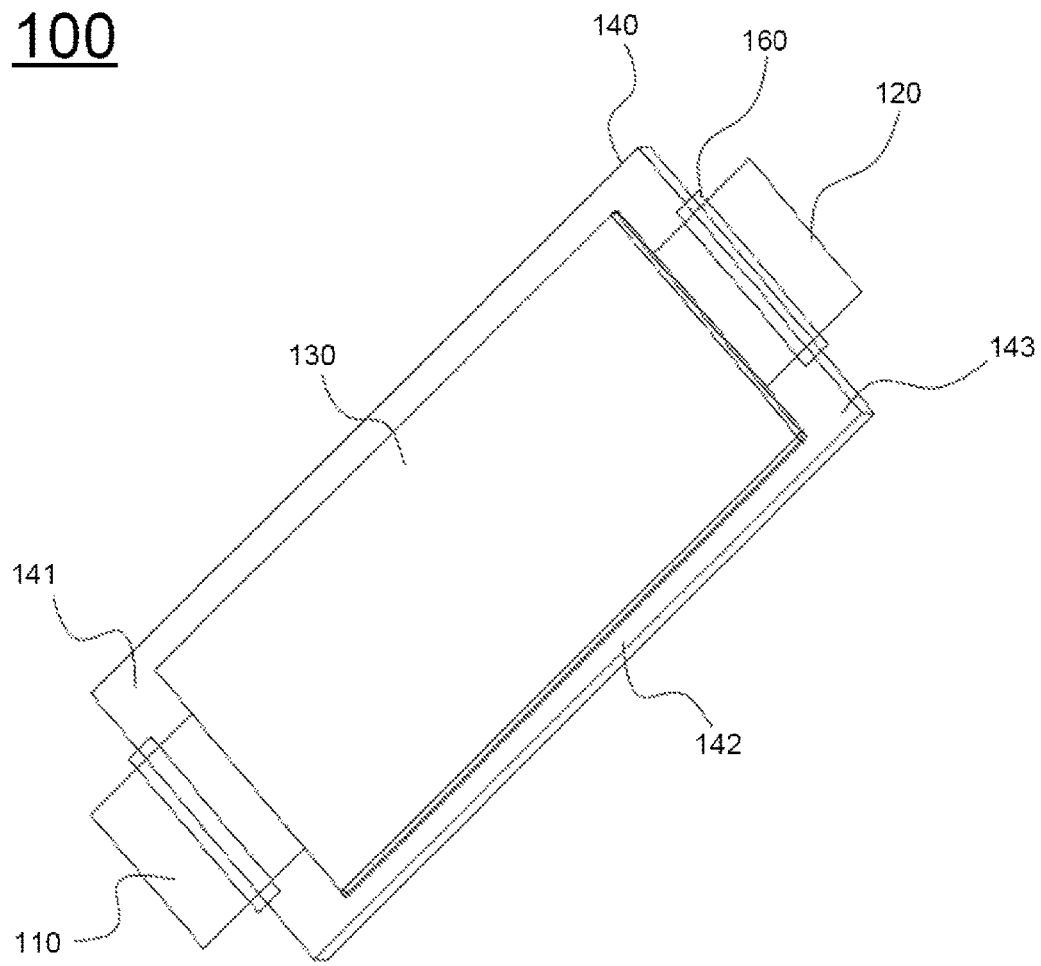
FIG. 1 is a perspective view showing a conventional representative pouch-shaped battery cell.
Figure 2:
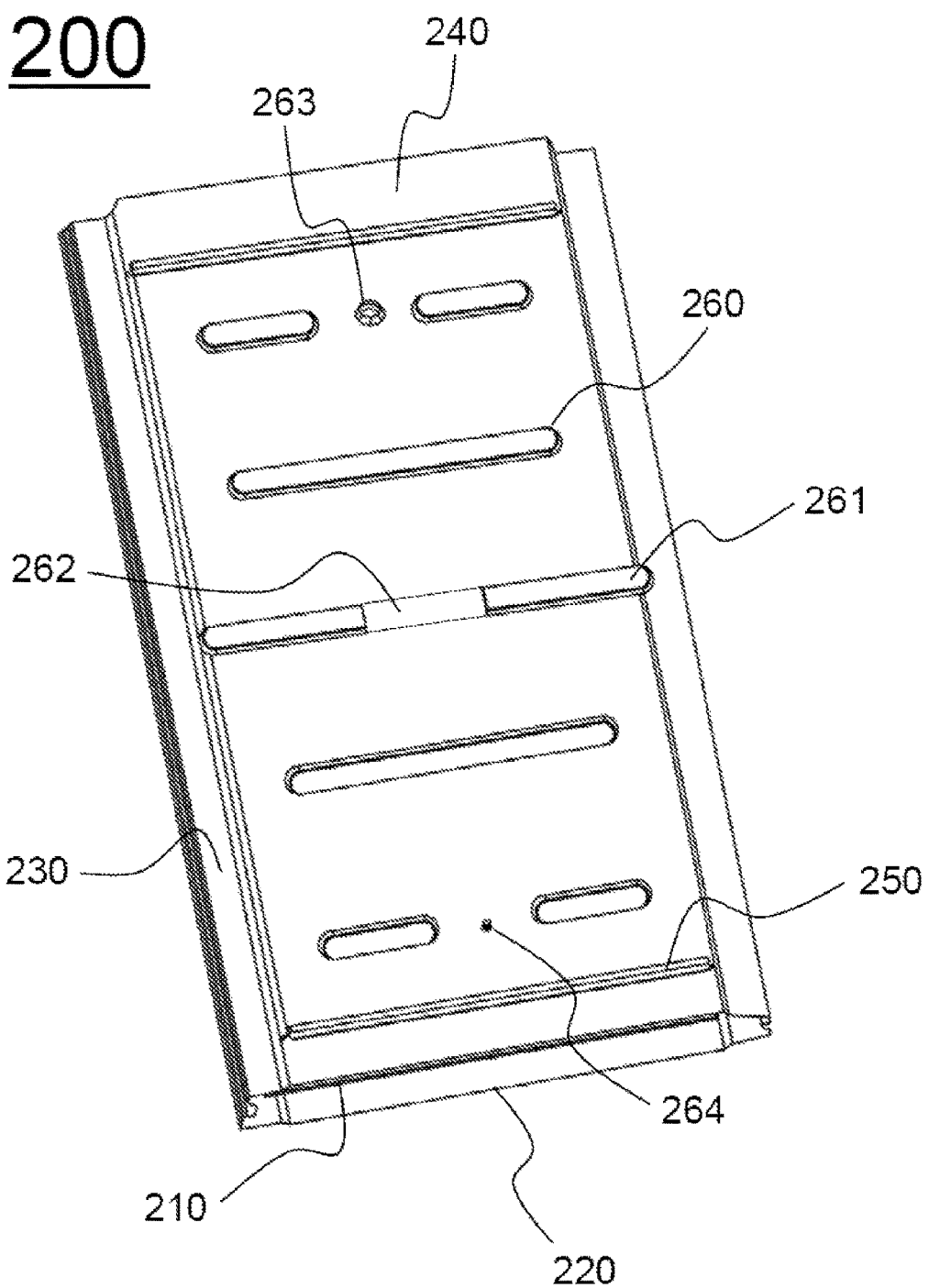
FIG. 2 is a perspective view showing a cell cover in which battery cells, one of which is shown in FIG. 1, will be mounted to constitute a unit module.

FIG. 2 is a perspective view showing a cell cover in which two battery cells, one of which is shown in FIG. 1, will be mounted to constitute a unit module.

Referring to FIG. 2, two pouch-shaped battery cells (not shown), one of which is shown in FIG. 1, are mounted in the cell cover 200. The cell cover 200 increases mechanical strength of the pouch-shaped battery cells and, in addition, facilitates the pouch-shaped battery cells to be easily mounted in a module case (not shown). Corresponding electrode terminals of the battery cells are connected to each other in series and then bent such that the battery cells come into tight contact with each other. In this state, the two battery cells are mounted in the cell cover 200.

The cell cover 200 includes a pair of members 210 and 220 which are coupled to each other. Each of the members 210 and 220 is formed of a high-strength metal sheet. Steps 230 for easily fixing the module are formed at the outside of the cell cover 200 adjacent to left and right sides of the cell cover 200. Steps 240 having the same function as the steps 230 are also formed at the upper end and the lower end of the cell cover 200. In addition, fixing parts 250 are formed at the upper end and the lower end of the cell cover 200 such that the fixing parts 250 extend in a lateral direction of the cell cover 200. As a result, the cell cover 200 may be easily mounted in the module case (not shown).

The cell cover 200 is provided at the outside thereof with a plurality of linear protrusions 260 spaced apart from each other in a longitudinal direction of the cell cover 200. A protrusion 261 formed at the middle of the cell cover 200 is provided with a depression 262, in which a thermistor (not shown) is mounted. In addition, the upper-end and lower-end ones of the linear protrusions, i.e. the upper-end and lower-end protrusions, are provided with projections 263 and 264 formed in opposite shapes.

However, these linear protrusions 260 and 261 may have various shapes. A battery module of FIG. 4, which will hereinafter be described, includes modified linear protrusions as shown in the drawing. Of course, this and other modifications fall into the category of the present invention.

Figure 3:
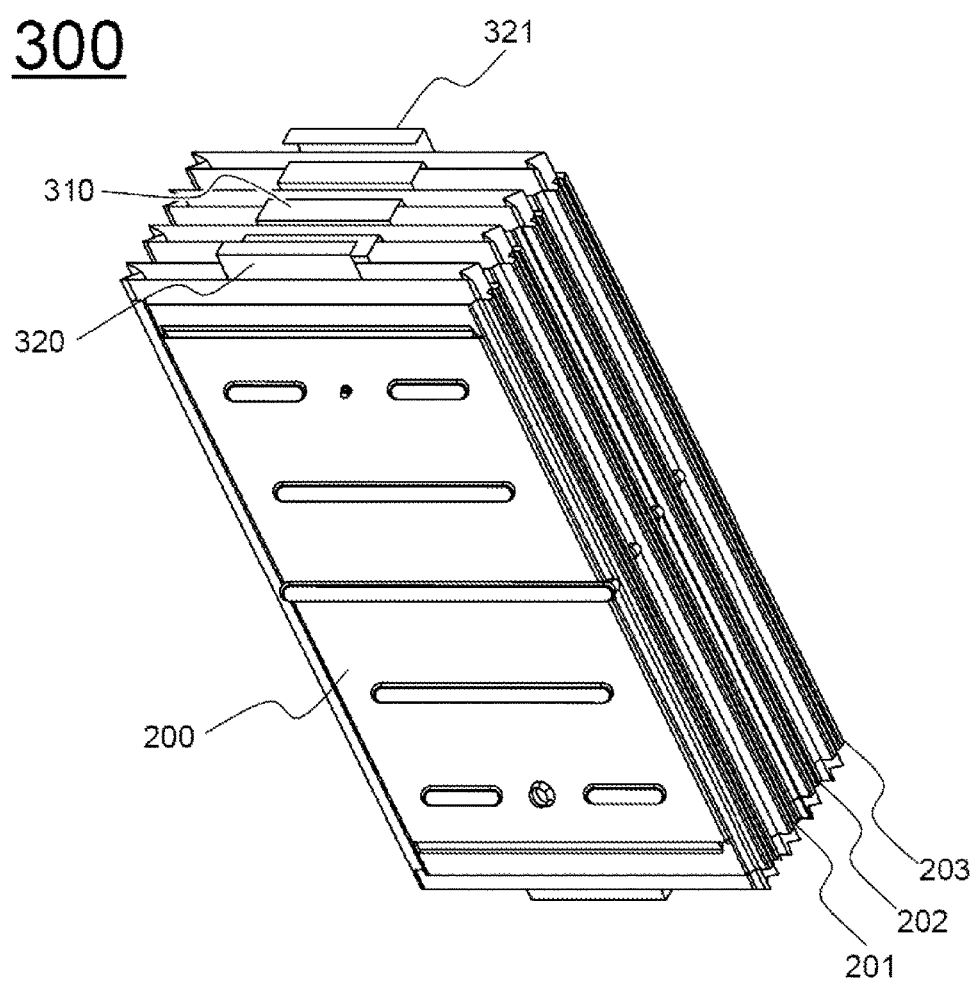
FIG. 3 is a perspective view showing a unit module stack including a plurality of unit modules connected to each other.
Figure 4:
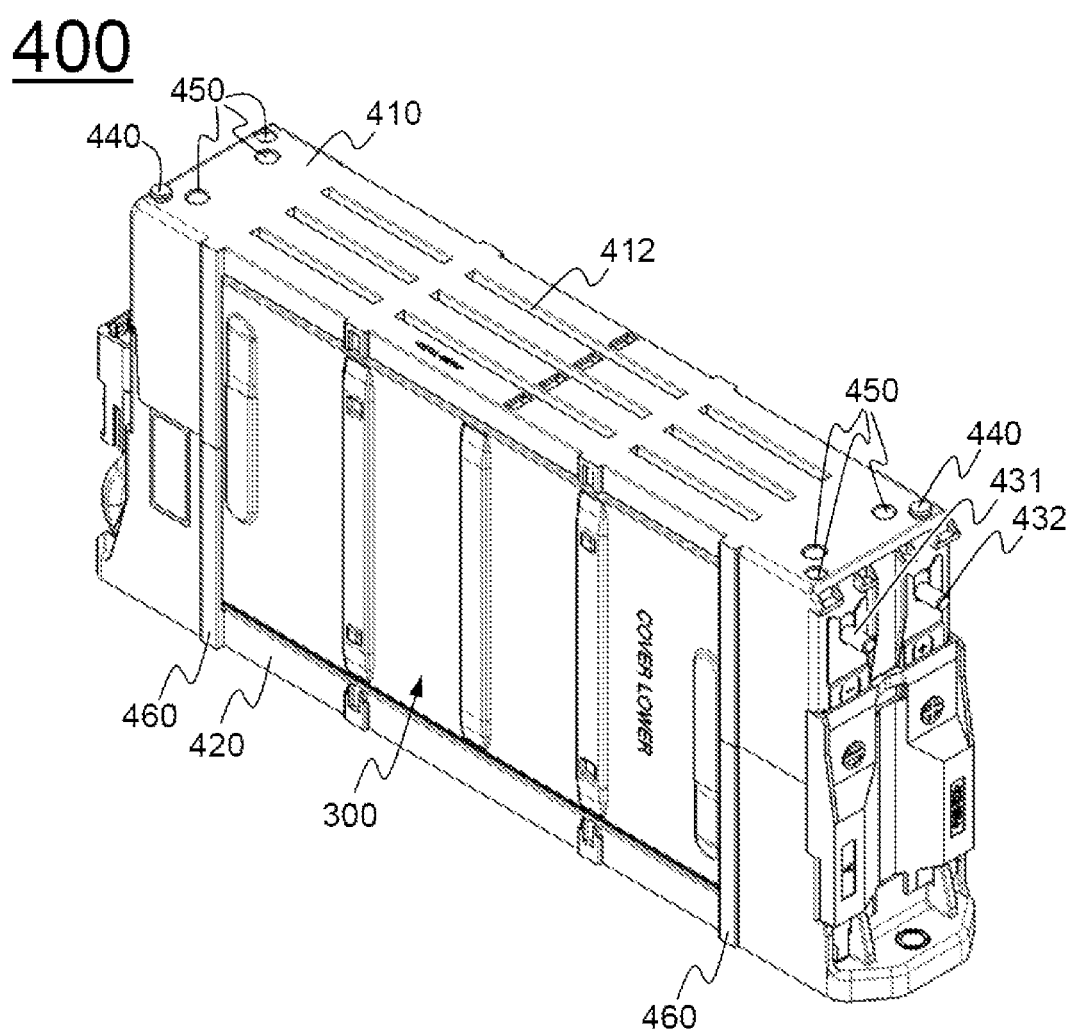
FIG. 4 is a perspective view of a battery module showing a structure in which the unit module stack of FIG. 3 is mounted in a battery module case.
Figure 5:
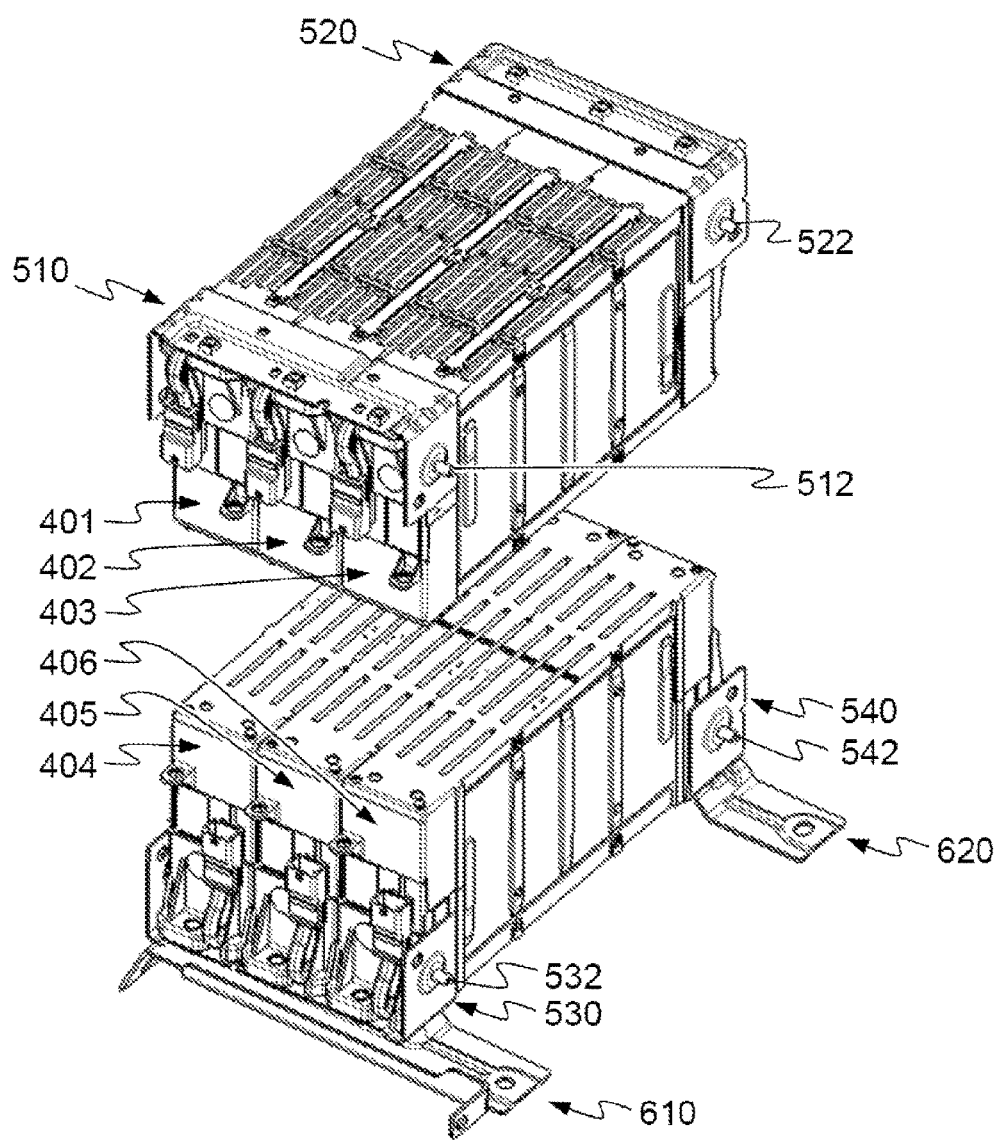
FIGS. 5 to 8 are exploded perspective views of a middle or large-sized battery pack according to an embodiment of the present invention.

FIG. 3 is a perspective view showing a unit module stack including a plurality of unit modules connected to each other and FIG. 4 is a perspective view showing a structure in which the unit module stack of FIG. 3 is mounted in a battery module case.

Referring first to FIG. 3, the unit module stack 300 includes four unit modules 200, 201, 202, and 203. Each of the unit modules 200 includes two battery cells (not shown). As a result, the unit module stack 300 includes a total of eight battery cells. Electrode terminals between the respective battery cells are connected in series to each other and electrode terminals between the respective unit modules are also connected in series to each other. Electrode terminal connections 310 are bent in a bracket shape in section to constitute a module assembly. Outside electrode terminals 320 and 321 of the outermost unit modules 200 and 201 are bent inward in a '¬' shape in section in a state in which the outside electrode terminals 320 and 321 protrude slightly more than the other electrode terminal connections 310.

Referring to FIG. 4, a battery module 400 is configured to have a structure in which the unit module stack 300 (see FIG. 3) is mounted in a module case including an upper case 410 and a lower case 420. The upper case 410 is configured to have a structure to surround one side, a portion of the upper end, and a portion of the lower end of the unit module stack 300 as shown in FIG. 3.

In addition, the unit module stack 300 is vertically stacked and through holes 412 are formed at the top and the bottom of the module case such that a vertical coolant flow channel is defined from the upper part to the lower part of the unit module stack 300.

The lower case 420 is coupled to the upper case 410 to surround the other side, a portion of the upper end, and a portion of the lower end of the unit module stack 300. External input and output terminals 431 and 432 connected to electrode terminals of the unit module stack 300 are located at the front of the lower case 420. That is, the upper and lower cases 410 and 420 are configured to have a structure to surround the outer circumference of the unit module stack 300 while exposing a major portion of the outer surface of the unit module stack 300 for easy heat dissipation of the unit module stack 300 mounted between the upper and lower cases 410 and 420 after the upper and lower cases 410 and 420 are assembled.

The upper case 410 is provided at opposite ends thereof with fastening protrusions 440 and fastening grooves 450, which are located at the interface between upper layer battery modules 401, 402, and 403 and lower layer battery modules 404, 405, and 406 for coupling between the upper layer battery modules 401, 402, and 403 and the lower layer battery modules 404, 405, and 406. Protrusions 460 having corresponding structures for easy coupling with other battery modules are also formed at the sides of the upper case 410.

In the above structure, a middle or large-sized battery pack can be assembled simply by inserting the fastening protrusions 440 into the corresponding fastening grooves 450, thereby achieving easy assembly. In addition, no additional accessory is necessary. Consequently, it is possible to prevent the increase of volume due to the additional accessory, whereby it is possible to design a middle or large-sized battery pack having a compact structure.

Figure 8:
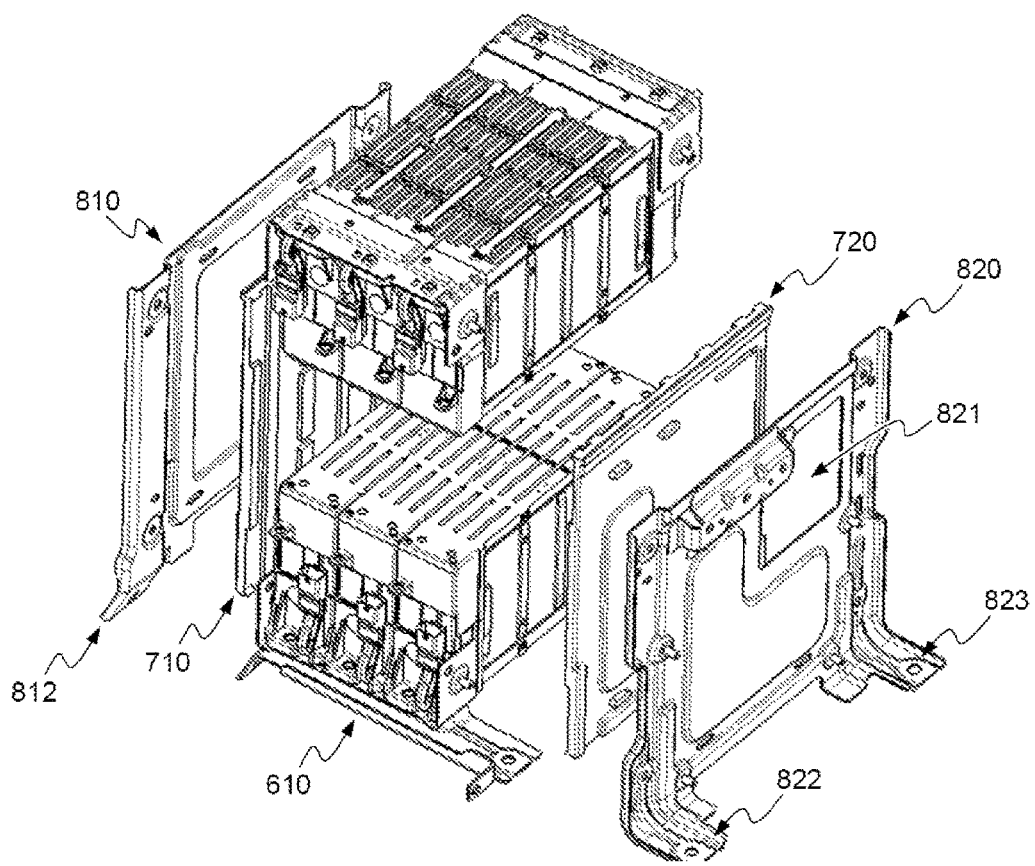
Figure 9:
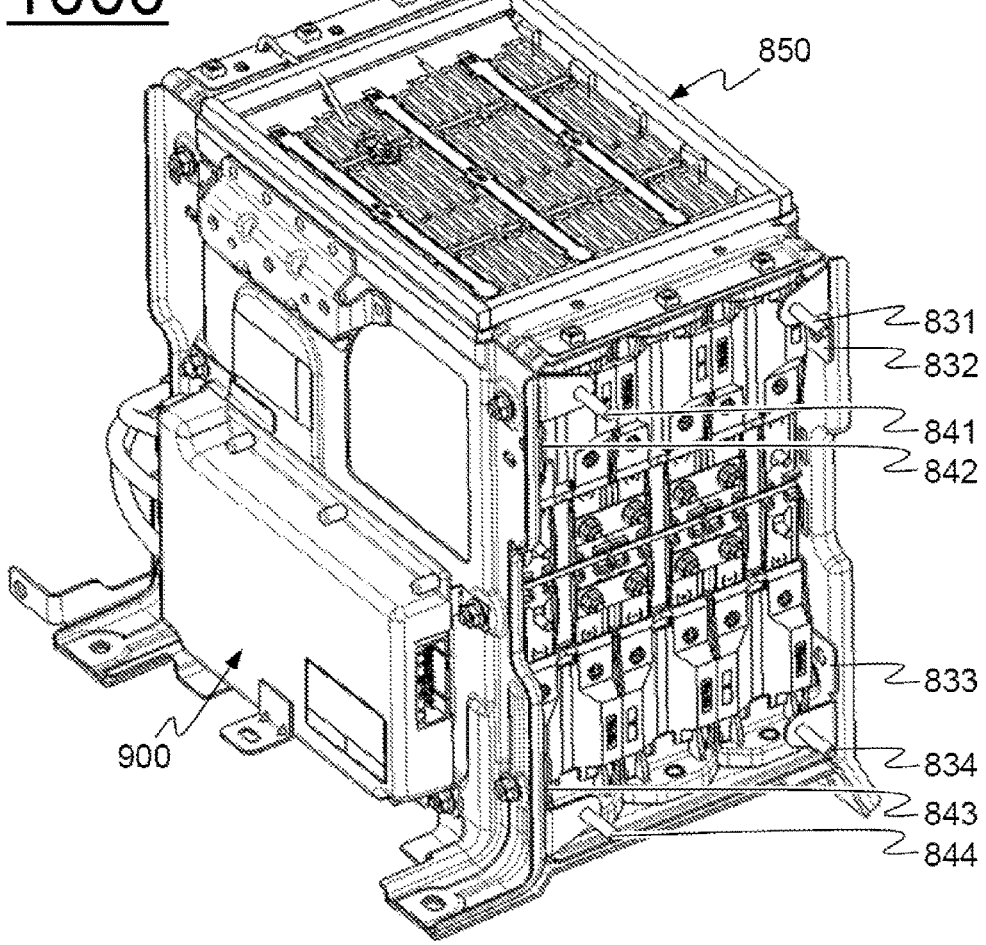
FIG. 9 is a perspective view of the middle or large-sized battery pack according to the embodiment of the present invention.

FIGS. 5 to 8 are exploded perspective views of a middle or large-sized battery pack according to an embodiment of the present invention and FIG. 9 is a perspective view of the middle or large-sized battery pack according to the embodiment of the present invention.

Referring to these drawings, the middle or large-sized battery pack 1000 includes six battery modules 401, 402, 403, 404, 405, and 406, a first upper layer connection member 510, a second upper layer connection member 520, a first lower layer connection member 530, a second lower layer connection member 540, side support members 810 and 820, insulation members 710 and 720, a first lower end support member 610, and a second lower end support member 620. The middle or large-sized battery pack 1000 is generally formed in the shape of a rectangular parallelepiped.

The six battery modules 401, 402, 403, 404, 405, and 406 are stacked to have a two layer structure in which three of the battery modules are horizontally arranged while being in contact with each other in a lateral direction to form an upper layer and the other of the battery modules are also horizontally arranged while being in contact with each other in the lateral direction to form a lower layer. The battery modules 401, 402, 403, 404, 405, and 406 are arranged in a state in which the upper layer battery modules 401, 402, and 403 are inversely stacked on the lower layer battery modules 404, 405, and 406 such that input and output terminals formed at one side of the battery modules 401, 402, 403, 404, 405, and 406 are adjacent to each other. That is, the upper layer battery modules 401, 402, and 403 are inversely stacked on the lower layer battery modules 404, 405, and 406 such that the upper layer battery modules 401, 402, and 403 and the lower layer battery modules 404, 405, and 406 are symmetric with respect to a horizontal center line.

Meanwhile, the first upper layer connection member 510 and the second upper layer connection member 520 respectively include frame bodies 510 and 520 formed in a bracket shape in vertical section to simultaneously surround a portion of opposite sides, the front upper end, and the rear upper end of the upper layer battery modules 401, 402, and 403 and coupling parts 512 and 522 extending from opposite sides of the frame bodies 510 and 520 such that the coupling parts 512 and 522 can be coupled to the side support members 810 and 820.

In addition, the first lower layer connection member 530 and the second lower layer connection member 540 respectively include frame bodies 530 and 540 formed in a bracket shape in vertical section to simultaneously surround a portion of opposite sides, the front lower end, and the rear lower end of the lower layer battery modules 404, 405, and 406 and coupling parts 532 and 542 extending from opposite sides of the frame bodies 530 and 540 such that the coupling parts 532 and 542 can be coupled to the side support members 810 and 820 and the lower end support members 610 and 620.

Meanwhile, the coupling parts 512, 522, 532 and 542 of the first and second upper layer connection members 510 and 520 and the first and second lower layer connection members 530 and 540 extend by a length L equivalent to 20 to 80% the vertical length H of each side of the module assembly 401, 402, 403, 404, 405, and 406.

Figure 6:
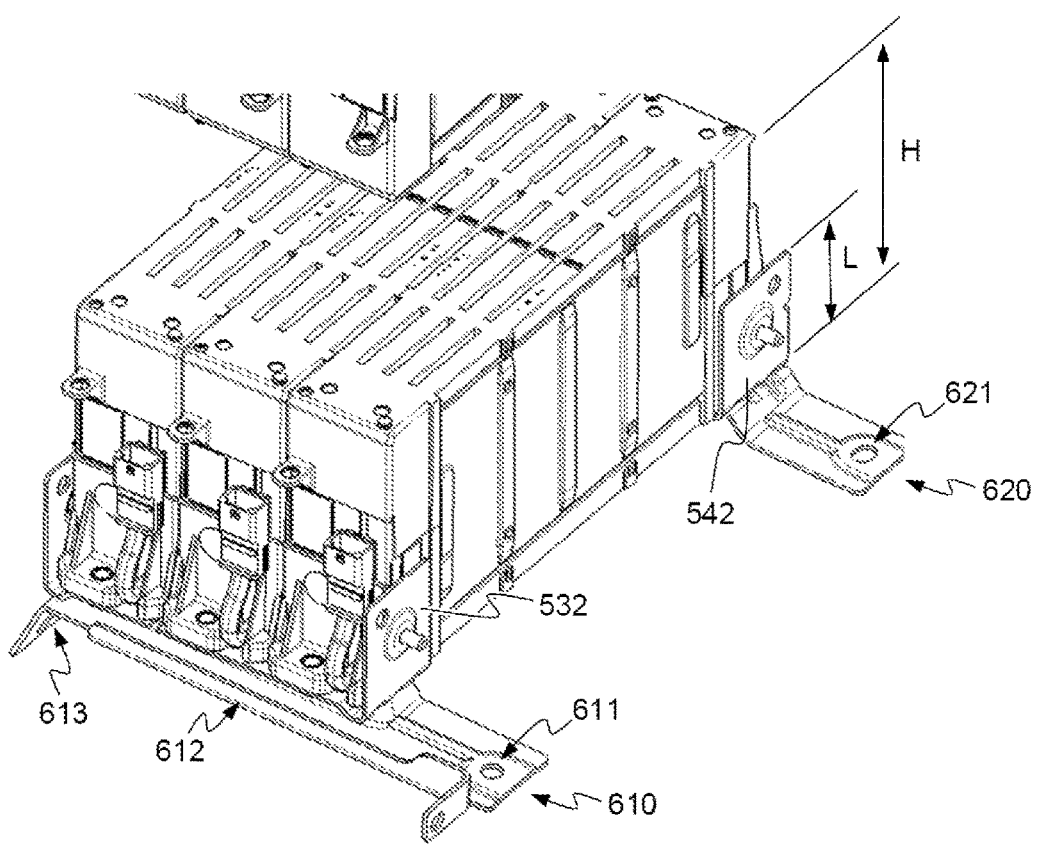
Figure 7:
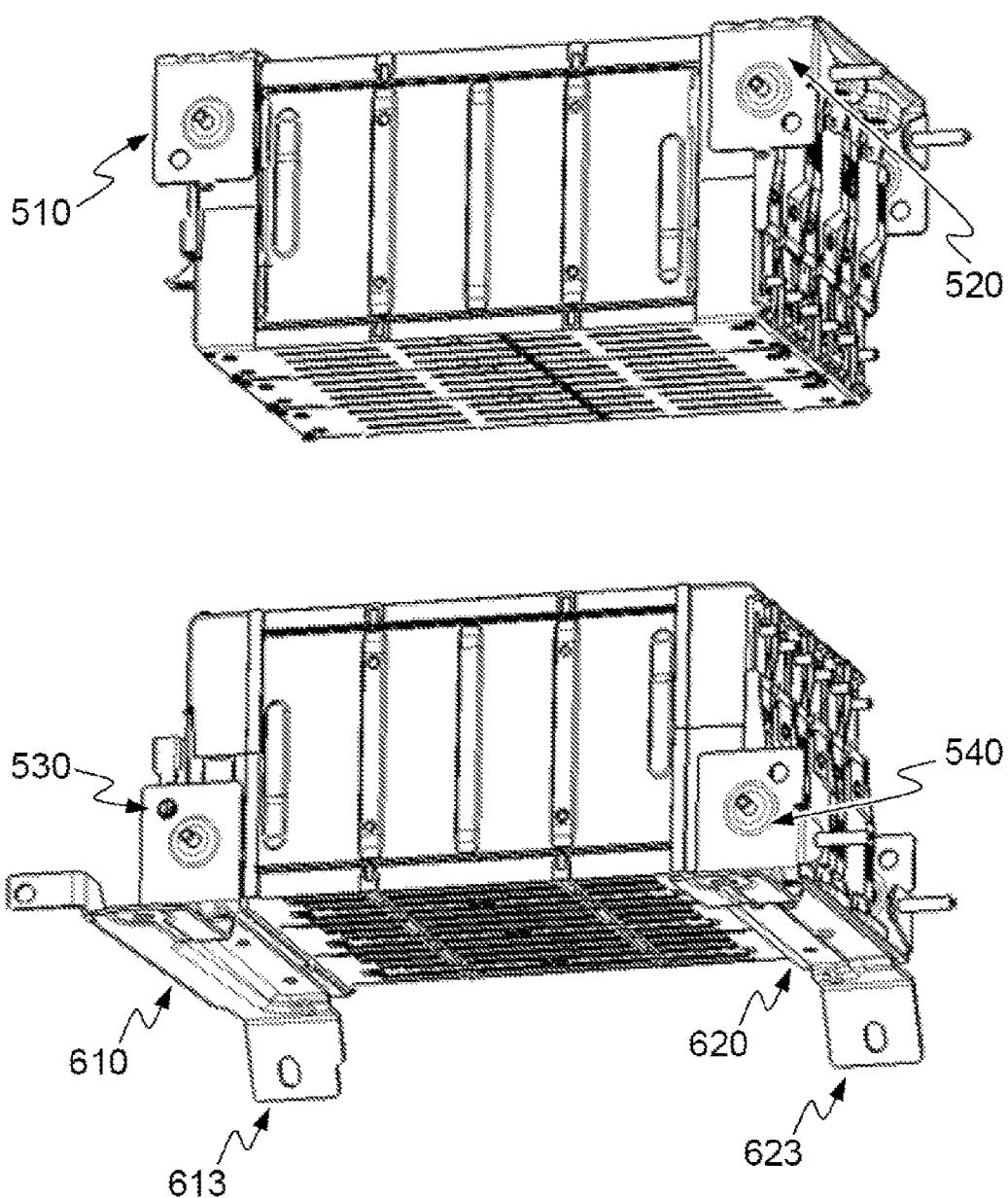

Referring to FIGS. 6 and 8, the side support members 810 and 820 respectively include plate-shaped bodies 810 and 820 disposed in tight contact with opposite sides of the module assembly and lower end frames 822, 823, and 812 bent so as to be coupled to the first lower end support member 610 and the second lower end support member 620.

In addition, the lower end frames 822 and 823 are respectively provided with through holes 611 and 621, through which fastening members (not shown) are inserted to be coupled to the first lower end support member 610 and the second lower end support member 620.

Meanwhile, the first lower end support member 610 and the second lower end support member 620 include a lower fixing rib 612 to support the bottom of the lower layer module assembly 404, 405, and 406 and coupling parts 611 and 613 extending from opposite sides of the lower fixing rib 612 so as to be coupled to the side support members 810 and 820.

Specifically, one of the coupling parts 611 and 613, e.g. the coupling part 611, horizontally extends from the lower fixing rib 612 and the other of coupling parts 611 and 613, e.g. the coupling part 613, extends from the lower fixing rib 612 while being bent.

Referring to FIG. 9, a battery management system (BMS) 900 to control operation of the battery pack is further mounted at the side support member 820 and fastening holes 831, 832, 833, 834, 841, 842, 843, and 844 for mounting a power relay assembly (PRA) (not shown) extending from the upper layer connection members, the lower layer connection members, the side support members, and the lower end support members are formed at one side of the module assembly at which the input and output terminals of the battery modules 401, 402, 403, 404, 405, and 406 are located such that the PRA is mounted to the module assembly through the fastening holes.

Figure 10:
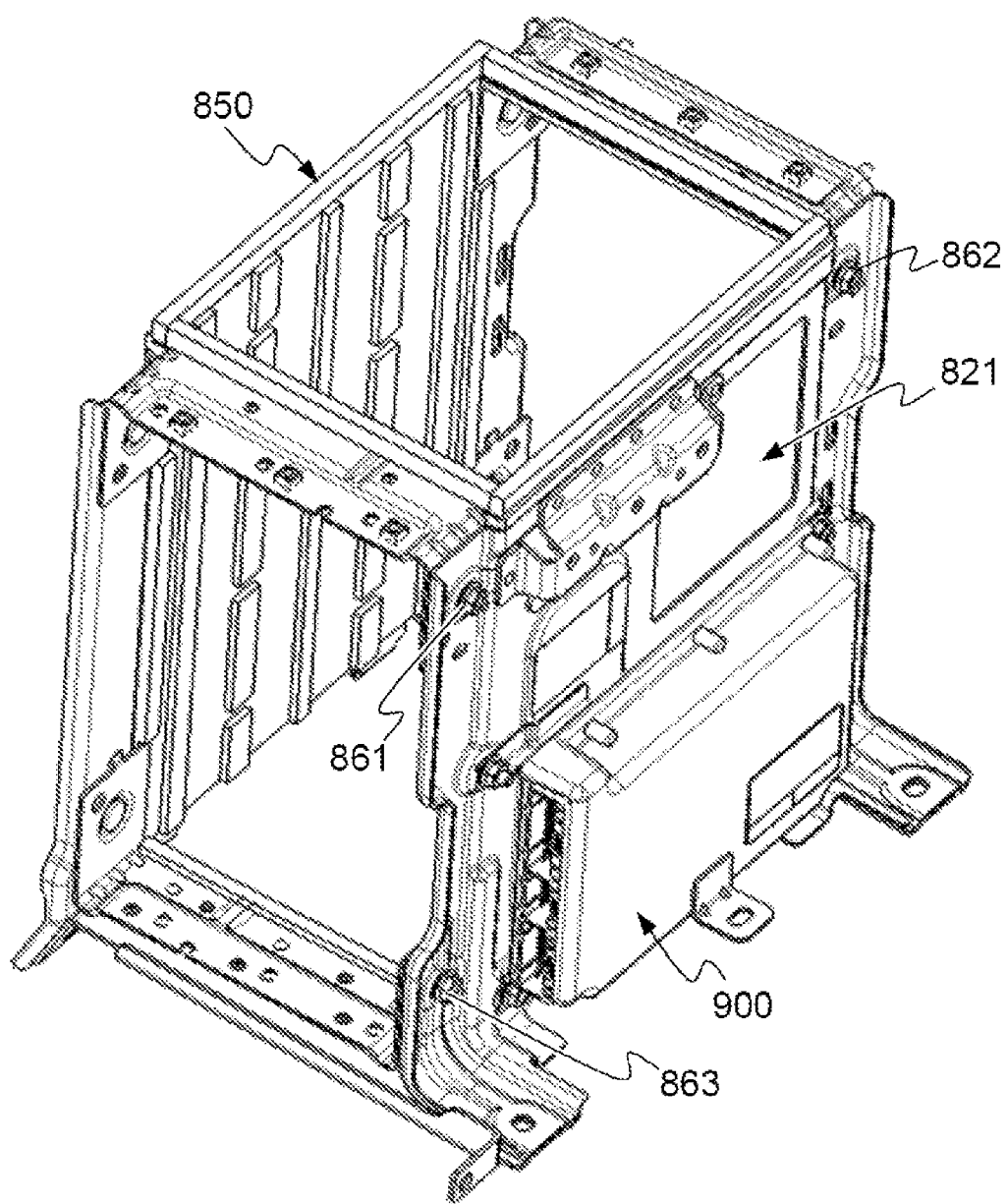
FIG. 10 is a perspective view showing the remaining structure of FIG. 9 excluding battery modules.
Figure 11:
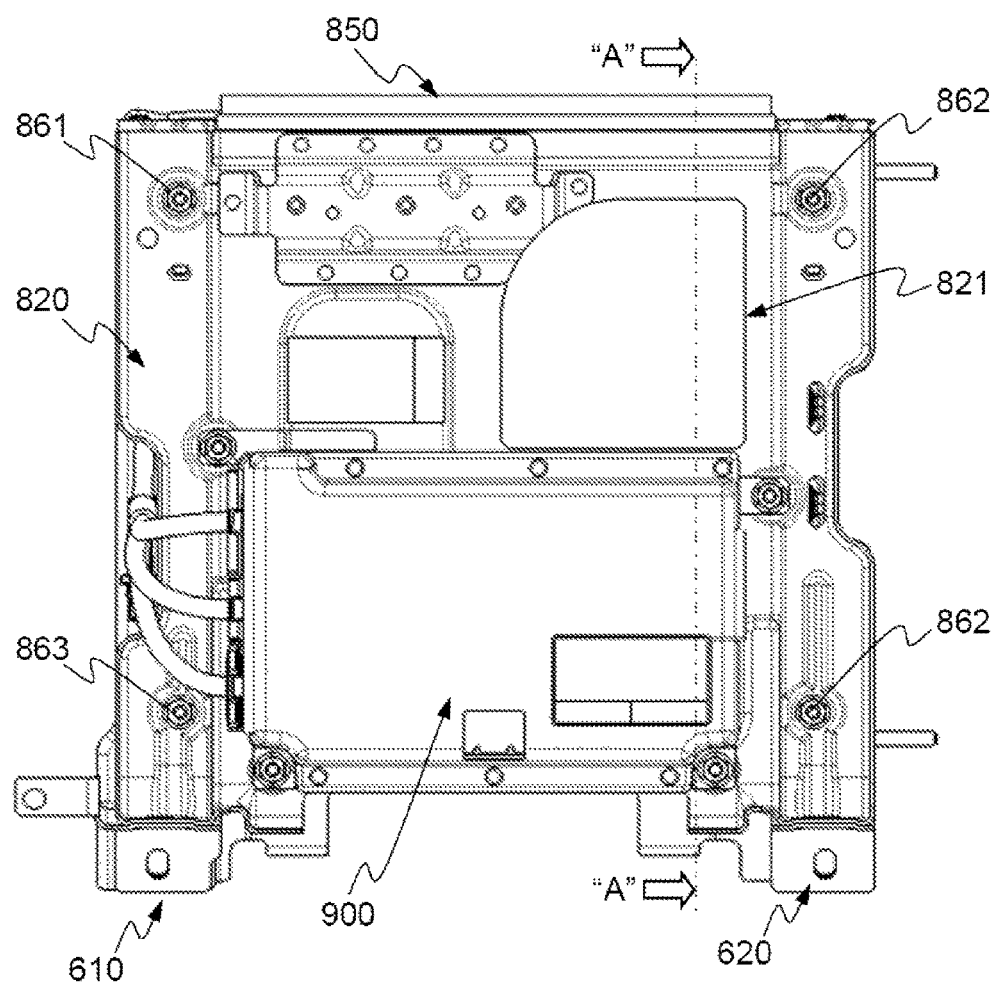
FIG. 11 is a side view of a side support member of FIG. 9 at an opening side.

FIG. 10 is a perspective view showing the remaining structure of FIG. 9 excluding the battery modules and FIG. 11 is a side view of the side support member of FIG. 9 at an opening side.

Referring to these drawings together with FIGS. 1 to 3, the side support member 820 includes an opening 821, through which portions corresponding to the electrode terminal connections of the battery module 300 are exposed such that the electrical connection portions 320 and 321 of the battery module 300 can be ruptured by expansion of the battery cell 100.

Figure 12:
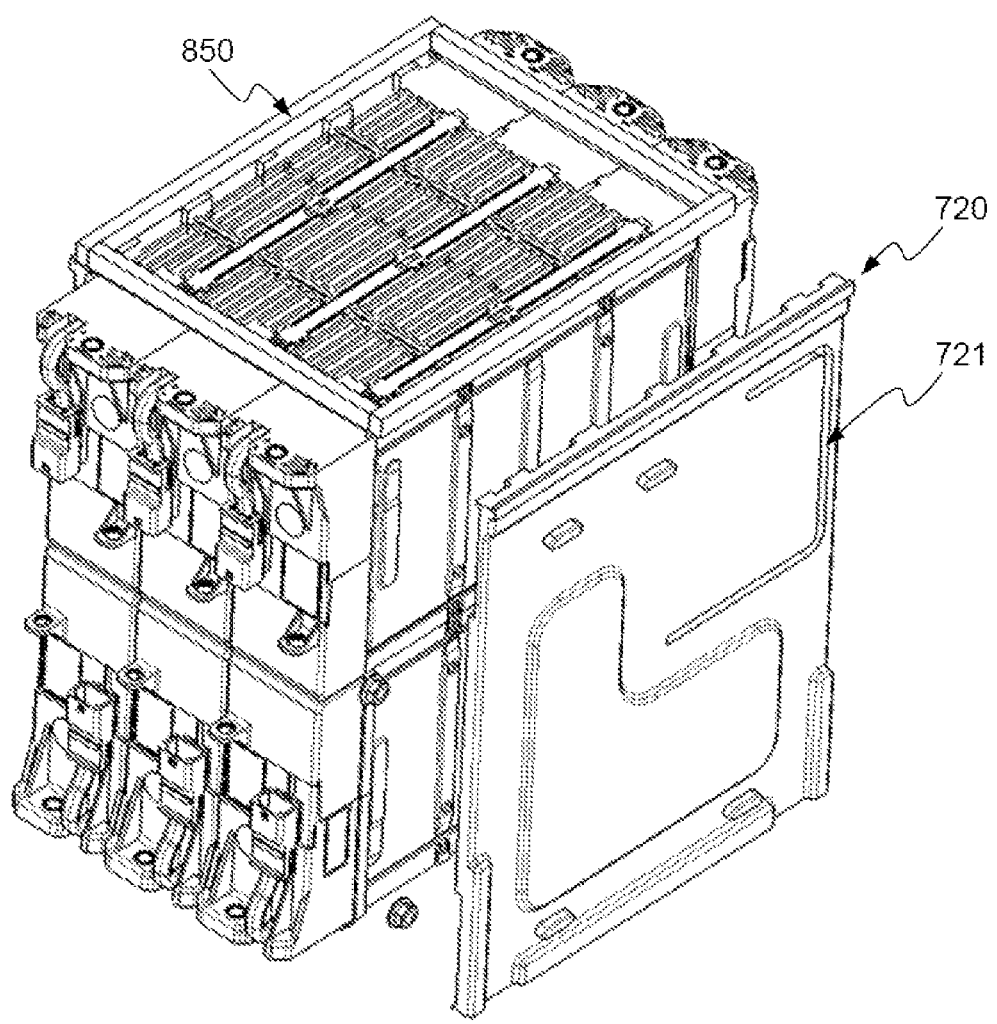
FIG. 12 is a perspective view of an insulation member.
Figure 13:
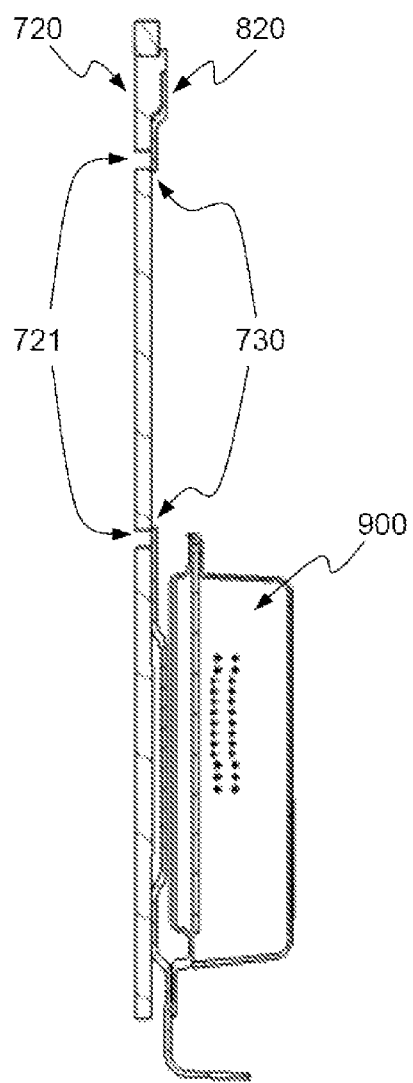
FIG. 13 is a sectional view taken along line A-A of FIG. 11.
Figure 14:
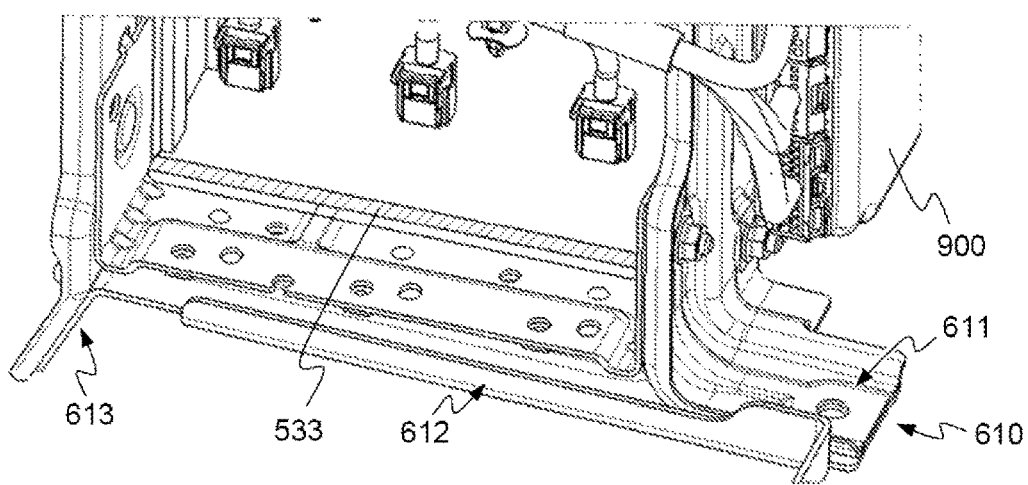
FIG. 14 is a partially enlarged view of FIG. 10.

FIG. 12 is a perspective view of an insulation member, FIG. 13 is a sectional view taken along line A-A of FIG. 11, and FIG. 14 is a partially enlarged view of FIG. 10.

Referring to these drawings together with FIGS. 1 to 3, the insulation member 720 includes a bracket-shaped cut-off part 721 formed so as to correspond to the electrode terminal connections of the battery module 300 such that the electrical connection portions 320 and 321 of the battery module 300 can be ruptured by expansion of the battery cell 100.

In addition, the bracket-shaped cut-off part 721 of the insulation member 720 is configured to have a structure 730 overlapping with the opening 821 of the side support member 820. Consequently, the bracket-shaped cut-off part 721 of the insulation member 720 closes the opening of the module assembly 401, 402, 403, 404, 405, and 406 such that coolant moves only through the module assembly stack 401, 402, 403, 404, 405, and 406.

Furthermore, an elastic sealing member 533 is further mounted inside the frame bodies of the first and second upper layer connection members 510 and 520 and the first and second lower layer connection members 530 and 540 contacting the module assembly 401, 402, 403, 404, 405, and 406 to prevent leakage of coolant.

The elastic sealing member 533 has the same function as the insulation members 710 and 720. Specifically, the elastic sealing member 533 serves to guide coolant such that the coolant limitedly flows in a specific direction and, at the same time, reduce temperature deviation between the outside and inside module assemblies.

Meanwhile, an upper end connection member 850 is further mounted along the top edge of the upper layer battery modules 401, 402, and 403. The upper end connection member 850 is configured to have a quadrangular frame structure when viewed from top. The upper end connection member 850 is coupled to the first and second upper layer connection members 510 and 520 and the side support members 810 and 820.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module assembly according to the present invention has effects in that the battery module assembly has a compact structure which can be stably mounted in a limited space, such as a vehicle, while minimally occupying the space, the frames for mounting can be easily mounted to an external device, and the battery module assembly is configured to have a structure in which coupling between the battery modules is improved, whereby the battery module assembly has excellent structural stability against external impact.

The invention claimed is:
1. A battery pack comprising:
an upper layer module assembly comprising two or more upper layer battery modules lying in a first plane;
a lower layer module assembly comprises two or more lower layer battery modules lying in a second plane, parallel and offset from the first plane;
each module comprises a chargeable and dischargable battery cell;
a first direction is defined by the stacking direction of the battery modules of the upper layer module assembly and the lower layer module assembly;
a pair of side support members surround sides of the upper and lower layer module assemblies;
a first upper layer connection member mounted at an upper surface of the upper layer module assembly to surround a portion of opposite sides and a front upper end of the battery modules of the upper layer module assembly, and a second upper layer connection member mounted at the upper surface of the upper layer module assembly to surround a portion of the opposite sides and a rear upper end of the battery modules of the upper layer module assembly, each of the first and second upper layer connection members comprises a frame body formed in a bracket shape in vertical section to simultaneously surround a portion of the opposite sides and the front upper end or the rear upper end of the module assembly, and coupling parts extending from opposite sides of the frame body such that the coupling parts are coupled to the side support members;
a first lower layer connection member mounted at a lower surface of the lower layer module assembly to surround a portion of opposite sides and a front lower end of the battery modules of the lower layer module assembly, and a second lower layer connection member mounted at the lower surface of the lower layer module assembly to surround a portion of the opposite sides and a rear lower end of the battery modules of the lower layer module assembly, each of the first and second lower layer connection members comprises a frame body formed in a bracket shape in vertical section to simultaneously surround a portion of the opposite sides and the front lower end or the rear lower end of the module assembly, and coupling parts extending from opposite sides of the frame body such that the coupling parts are coupled to the side support members;
the pair of side support members coupled to the upper layer connection members and the lower layer connection members;
interfaces between the sides of the upper and lower layer module assemblies and the side support members comprise insulation members mounted thereto;
a first lower end support member is coupled to the first lower layer connection member, has a length which is longer than a length of the first lower layer connection member in the first direction, and is coupled to the side support members in a second direction perpendicular to the first direction, and
a second lower end support member is coupled to the second lower layer connection member, has a length which is longer than the length of the second lower layer connection member in the first direction, and is coupled to the side support members in the second direction.
2. The battery pack according to claim 1, wherein each of the battery modules is configured to have a structure in which two or more battery cells or two or more unit modules each comprising a battery cell are mounted in a module case in a state in which the battery cells or the unit modules are electrically connected to each other.
3. The battery pack according to claim 1, wherein the coupling parts of the first and second upper layer connection members and the first and second lower layer connection members extend by a length equivalent to 20 to 80% a vertical length of each side of the module assembly.
4. The battery pack according to claim 1, wherein each frame body is further provided at a region thereof contacting the module assembly with an elastic sealing member to prevent leakage of coolant.
5. The battery pack according to claim 1, wherein each of the side support members comprises a plate-shaped body disposed in tight contact with a corresponding side of the module assembly, and a lower end frame bent so as to be coupled to the first or second lower end support member.
6. The battery pack according to claim 5, wherein the lower end frame is provided with through holes, through which fastening members are inserted to be coupled to the first or second lower end support member.
7. The battery pack according to claim 1, wherein at least one of the side support members comprises an opening, through which portions corresponding to electrode terminal connections of a corresponding one of the battery modules are exposed such that electrical connection portions of the battery module can be ruptured by expansion of the battery cell.
8. The battery pack according to claim 1, wherein at least one of the side support members is further provided with a battery management system (BMS) to control operation of the battery pack.
9. The battery pack according to claim 1, wherein at least one of the insulation members comprises a L'-shaped or bracket-shaped cut-off part formed so as to correspond to electrode terminal connections of a corresponding one of the battery modules such that electrical connection portions of the battery module can be ruptured by expansion of the battery cell.
10. The battery pack according to claim 1, wherein each of the first and second lower end support members comprises a lower fixing rib to support a bottom of the lower layer module assembly, and coupling parts extending from opposite sides of the lower fixing rib so as to be coupled to the side support members.
11. The battery pack according to claim 10, wherein one of the coupling parts horizontally extends from the lower fixing rib, and the other of coupling parts extends from the lower fixing rib while being bent.
12. The battery pack according to claim 1, wherein the upper layer battery modules are inversely stacked on the lower layer battery modules such that input and output terminals of the upper layer battery modules and input and output terminals of the lower layer battery modules are adjacent to each other.
13. The battery pack according to claim 12, wherein a power relay assembly (PRA) is mounted at one side of each of the module assemblies at which the input and output terminals of the battery modules are located.
14. The battery pack according to claim 13, wherein fastening holes for mounting the PRA extending from at least one selected from a group consisting of the upper layer connection members, the lower layer connection members, the side support members, and the lower end support members are formed at one side of the module assembly at which the PRA is mounted.

15. The battery pack according to claim 1, further comprising an upper end connection member mounted along a top edge of the upper layer module assembly.

16. The battery pack according to claim 15, wherein the upper end connection member is configured to have a quadrangular frame structure when viewed from top and is coupled to the upper layer connection members and/or the side support members.

17. The battery pack according to claim 1, wherein the battery cell is a lithium secondary battery.

18. The battery pack according to claim 1, wherein the battery cell is a pouch-shaped battery cell configured to have a structure in which an electrode assembly is mounted in a battery case formed of a laminate sheet comprising a metal layer and a resin layer.

19. The battery pack according to claim 2, wherein each of the unit modules comprises two or more battery cells, electrode terminals of which are connected to each other in series and electrode terminal connections of which are bent such that the battery cells are stacked, and a pair of cell cases coupled to each other to surround an outside of the battery cells excluding the electrode terminals.

20. The battery pack according to claim 1, wherein each of the battery modules is configured to have a structure in which one or more unit modules are sequentially stacked and mounted in a module case.

21. The battery pack according to claim 20, wherein each of the battery modules is configured to have a structure in which two or more unit modules are vertically stacked, and through holes are formed at a top and a bottom of the module case such that a vertical coolant flow channel is defined from an upper part to a lower part of the battery module.

22. The battery pack according to claim 1, wherein fastening protrusions and fastening grooves for coupling between the upper layer battery modules and the lower layer battery modules are provided at an interface between the upper layer battery modules and the lower layer battery modules.

23. A device comprising a battery pack according to claim 1 as a power source.

24. The device according to claim 23, wherein the device is an electric vehicle, a hybrid electric vehicle, a plug-in hybrid electric vehicle, or a power storage device.

25. The battery pack according to claim 1, wherein the coupling parts of the first and second upper layer connection members and the first and second lower layer connection members extend by a length equivalent to 20 to 80% a vertical length of each side of the module assembly.

26. The battery pack according to claim 1, wherein the frame body is further provided at a region thereof contacting the module assembly with an elastic sealing member to prevent leakage of coolant.

* * * * *